United States Patent [19]
Mutoh et al.

[11] Patent Number: 5,583,406
[45] Date of Patent: Dec. 10, 1996

[54] CONTROL METHOD AND SYSTEM FOR REGENERATION BRAKING OF AN ELECTRIC VEHICLE

[75] Inventors: Nobuyoshi Mutoh, Katsuta; Satoru Kaneko, Hitachi; Ryoso Masaki, Hitachi; Tsutomu Ohmae, Hitachi, all of Japan

[73] Assignee: Hitachi, Ltd., Tokyo, Japan

[21] Appl. No.: 341,964

[22] Filed: Nov. 16, 1994

[30] Foreign Application Priority Data

Nov. 16, 1993 [JP] Japan .................................... 5-286396

[51] Int. Cl.⁶ .................................................... H02P 3/14
[52] U.S. Cl. ........................ 318/376; 318/362; 318/371; 318/139
[58] Field of Search .................................. 318/376, 362, 318/371, 366, 139; 388/934; 180/65.1, 68.5, 65.3; 136/293

[56] References Cited

U.S. PATENT DOCUMENTS

| | | | |
|---|---|---|---|
| 4,124,812 | 11/1978 | Naito et al. | 318/376 X |
| 4,691,148 | 9/1987 | Nicholls et al. | 318/139 X |
| 5,015,937 | 5/1991 | Wright et al. | 318/376 X |
| 5,123,081 | 6/1992 | Bachman et al. | 388/934 |
| 5,322,352 | 6/1994 | Ohno et al. | 318/139 X |
| 5,323,868 | 6/1994 | Kawashima | 180/65.1 X |
| 5,377,791 | 1/1995 | Kawashima et al. | 318/139 X |
| 5,384,522 | 1/1995 | Toriyama et al. | 318/376 X |

*Primary Examiner*—William M. Shoop, Jr.
*Assistant Examiner*—Karen Masih
*Attorney, Agent, or Firm*—Antonelli, Terry, Stout & Kraus

[57] ABSTRACT

When a voltage level determinator judges from the terminal voltage of a smoothing capacitance that a battery is in an over-charged state and cannot receive regeneration energy, a regeneration/free-wheel mode selector switches to a free-wheel mode for consuming the energy of the battery. For this purpose, a torque reducing signal generator executes a control in which only a magnetizing component of current flows through the primary winding and no driving force is generated in the motor, with the result that the energy of the battery is consumed as heat loss inside the motor. Then, when the over-charged state is eliminated and the energy receiving capability of the battery is recovered, the regeneration/free-wheel mode selector switches the mode to the regeneration mode to obtain regeneration braking.

15 Claims, 6 Drawing Sheets

CONTROL METHOD AND SYSTEM FOR REGENERATION BRAKING OF AN ELECTRIC VEHICLE

BACKGROUND OF THE INVENTION

The present invention relates to a control system and method for regeneration braking of an electric vehicle, and more particularly to regeneration brake control for an electric vehicle having, a battery and an alternating current motor.

A conventional control method for regeneration braking of a vehicle is disclosed in Japanese Patent Application Laid-Open No.1-126103 (1989). According to that method, regeneration braking by a motor is actuated prior to mechanical braking to effectively recover regeneration energy to a battery by surely working the regeneration braking.

However, in the prior technique described above, there are some cases where the battery does not have the capability of receiving the regeneration energy, and consequently the regeneration braking force is insufficient depending on the state of the battery. As a result, the required braking force cannot be obtained. The cases arise when, for example, the battery is over-charged. In this case, since the battery is in a state in which it is incapable of receiving further energy, the battery does not accept the regeneration energy even though the battery is allowed to recover regeneration energy. As described above, when the battery is unfortunately in an over-charged state during braking, the require force of regeneration braking may not be obtained.

Further, in another known control method for regeneration braking of an electric vehicle, the surplus regeneration energy is consumed by providing a resistance and a switching element on the vehicle. In order to sufficiently consume the regeneration energy by this method, however, it is necessary to provide a resistance and switching element having a large wattage, which leads to an increase in the weight of the electric vehicle and brings about bad effects in the performance and the cost of the vehicle.

Furthermore, there is a disadvantage in that it is difficult to properly design the wattage of the resistance since the regeneration energy changes depending on the driving condition of the vehicle, which raises a problem concerning reliability of the system.

SUMMARY OF THE INVENTION

An object of the present invention is to provide a control system and method for regeneration braking of electric vehicle wherein the required force of regeneration braking can be always kept independent of the state of the battery.

Another object of the present invention is to consume surplus regeneration energy without providing a special resistance and switching element for this purpose in an electric vehicle.

A feature of the present invention is that, in a control method for regeneration braking of an electric vehicle having an electric power converter for converting and supplying the power of a battery to the motor for driving the vehicle, a running controller is provide for controlling the electric power converter using a pulse width modulation method, and braking force is applied to the motor while regeneration energy from the motor is being charged to the battery. The control method comprises switching the mode to a consumption mode where the accumulated energy in the battery is consumed without causing acceleration in the vehicle when the energy receiving capability of the battery is lower than a preset value during braking, and switching the mode to a regeneration mode where the regeneration energy is accumulated in the battery when the energy receiving capability of the battery is higher than a preset value.

Another feature of the present invention is that a control system for regeneration braking of an electric vehicle has means for applying a braking force to a motor while the regeneration energy from the motor is being accumulated in a battery, which control system comprises receiving capability detecting means for detecting the energy receiving capability of the battery, mode switching control means for switching the mode to the consumption mode when the accumulated energy in the battery is consumed without causing acceleration of the vehicle or to the regeneration mode when the regeneration energy is accumulated in the battery depending on information concerning the energy receiving capability obtained from the receiving capability detecting means.

According to the present invention, by detecting the charged state of the battery, a switching mode is selected based on the charged state of the battery to enable either the regeneration mode where the regeneration energy produced by the motor is received by the battery or the consumption mode where the accumulated energy in the battery is consumed by the motor and the inverter without causing acceleration of the electric vehicle. Thereby, the regeneration braking force can be always maintained independent of the state of the battery.

More specifically, by detecting the voltage of the battery or the charging current of the battery during braking, it can be determined whether the battery is in an over-charged state or not, that is, whether the battery is in a state capable of receiving energy or not. Further, when the temperature of the battery exceeds an allowable limit, it can be determined that the battery is in a state incapable of receiving energy even when the judgement based on the voltage or current indicates that the battery is in a state capable of receiving energy.

If it is determined that the battery is incapable of receiving energy, the accumulated energy of the battery is consumed by switching the mode to the consumption mode using a mode selector. That is, the accumulated energy of the battery is consumed by supplying current to the motor and the inverter in such a manner that acceleration of the electric vehicle is not caused. If the energy is consumed sufficiently to avoid the over-charged state, the energy receiving capability of the battery is recovered, since the over-charged state is eliminated. When the energy receiving capability is recovered, the regeneration energy is received by the battery by switching the mode to the regeneration mode. As described above, the regeneration braking force is maintained by performing switching between the regeneration mode and the consumption mode.

In a free-wheel mode, which is one form of the consumption mode, the energy of the battery is consumed by supplying only the exciting current component of vector control current to the primary winding of the motor using torque current reducing means, such that driving torque is not generated in the motor. That is, the energy of the battery is dissipated as heat loss with the resistance of the motor and the inverter instead of utilizing the energy for generating driving torque of the vehicle.

On the other hand, in a direct current braking mode, which is another embodiment form of the consumption mode, the energy of the battery is consumed by supplying direct current to the primary winding of the motor. A fixed magnetic field is formed by the direct current excitation of the primary winding, the rotor passing across the magnetic field to generate an electric motive force, and so a braking force is obtained through operation of the motor as a generator. In this mode, a part of the braking force can be obtained while the energy of the battery is being consumed. However, the required braking force cannot be obtained by this mode only, the main role of this mode being to consume the surplus energy of the battery, similar to the free-wheel mode described above.

As described above, in accordance with the present invention, since the energy of the battery is intentionally consumed depending on the state of the battery during braking, while the energy receiving capability of the battery is always being revived, a regenerating braking force can be efficiently obtained. Particularly, the method is especially efficient when the battery is in an over-charged state. Further, since surplus regeneration energy always can be recovered into the battery, there is no need to provide a resistance and a switching element having a large wattage, as in the conventional method.

DETAILED DESCRIPTION OF THE PREFERRED EMBODIMENTS

Figure 1:
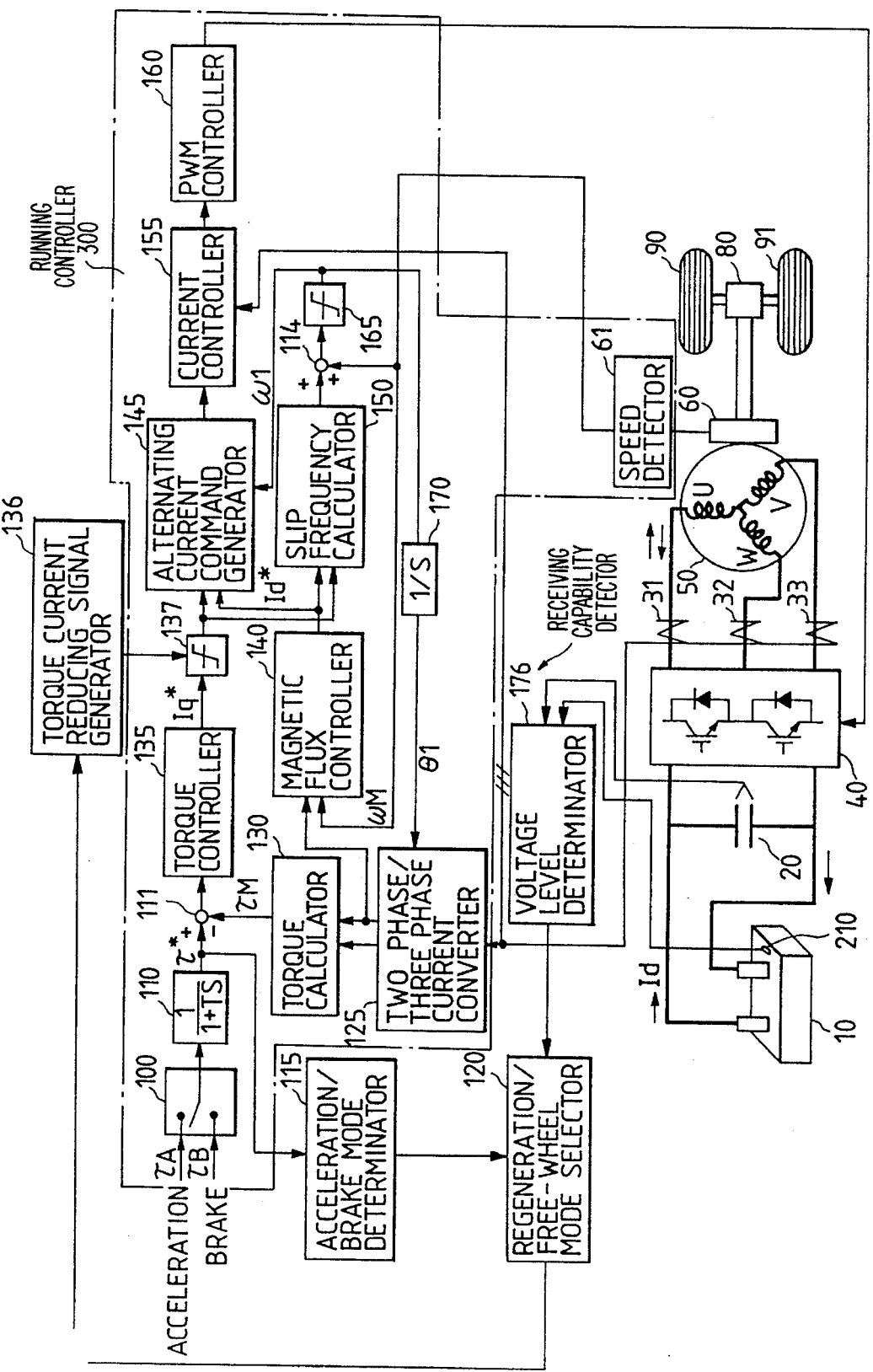
FIG. 1 is a block diagram showing an embodiment of a control system of for regeneration braking of an electric vehicle utilizing a free-wheel mode in accordance with the present invention.

The present invention will be described in detail below, referring to the accompanying drawings. FIG. 1 is a block diagram showing an embodiment of a control system for regeneration braking of an electric vehicle utilizing a free-wheel mode in accordance with the present invention. In this embodiment, the regeneration braking control is preformed by adding the free-wheel mode as an energy consumption mode.

Electric power of a battery 10 is supplied to the U-phase, V-phase, and W-phase of the primary winding of a motor 50 through a smoothing capacitor 20 and an inverter 40. Current sensors 31, 32 and 33 are provided in the primary winding. Output torque of the motor 50 is transmitted to wheels 90 and 91 of an electric vehicle through an encoder 60 and a differential gear 80. The speed and the torque of the motor 50 are controlled based on an acceleration command τA and a brake command τB and from the output of a speed detector 61. The voltage of the battery is detected from the terminal voltage of the smoothing capacitor 20 connected in parallel to the battery 10. In this regard the voltage is detected at the terminals to prevent occurrence of a judging error due to any fluctuation in the voltage. A voltage level determinator 176 operates as a receiving capability detector and judges that the battery is in an over-charged state when the voltage of the battery exceeds a preset value. A typical electric vehicle has a plurality of batteries. For example, 12 V batteries of 20 to 28 in number are connected in series to obtain a battery voltage of 240 to 300 V. Therefore, by detecting the state of each of the plural batteries, the following control may be performed by the running controller 300 based on the battery having the lowest level among the batteries.

The operation of the embodiment in FIG.1 will be described below.

When the accelerator is initially depressed, an acceleration command τA corresponding to the extent of actuation is input into a filter 110, and a torque command τ* of a torque control system is obtained. Then, in the case of acceleration where the change with time of the torque command τ* is positive (in a case of dτ*/dt≧0), an acceleration signal is supplied to a regeneration/free-wheel mode selector 120 from an acceleration/braking mode determinator 115. In this case, the regeneration braking is not performed, since the vehicle is in an acceleration mode.

Since the electric power of the battery 10 is being input to the motor 50 through the inverter 40 at this time, the battery voltage judged by the voltage level determinator 176 will be below a preset value. As a result, a reducing stop command is supplied to a torque current reducing signal generator 136 from the regeneration/free-wheel mode selector 120, and so the limiter value of a limiter 137 is held to a preset value.

Next, in a case where the change with time of the torque command τ* is negative (in a case of dτ*/dt<0), a brake signal is put out from the acceleration/braking mode determinator 115. If a brake signal is put out and the terminal voltage of the smoothing capacitor 20 judged by the voltage level determinator 176, that is, the voltage of the battery, is below the preset value, it is judged that the energy receiving capability of the battery is larger than a preset value. In this case, the regeneration mode is selected by the regeneration/free-wheel mode selector 120 to perform regeneration braking.

In the case of the regeneration mode, a reducing stop command is put out to the torque current reducing signal generator 136 from the regeneration/free-wheel mode selector 120, and the limiter value in the limiter 137 is held to a preset value. Then, the torque τM generated in the motor 50 is controlled so as to follow the torque command τ*.

Herein, the torque τM is calculated from Equations (1) to (6) below by integration of the inverter angular frequency ω1 obtained from the primary current iu, iv, iw of the motor 50, ∫ω1dt, using an integrator 170, and by obtaining the torque component of the current Iq and the magnetizing component of the current Id using the instantaneous phase θ1.

$$\tau M = Kt \cdot \phi 2 \cdot Iq, \quad (1)$$

$$\phi 2 = lm \cdot Id/(1+T2 \cdot s), \quad (2)$$

where $$Kt = m \cdot p \cdot lm/(lm+l2), \quad (3)$$

$$T2 = (lm+l2)/r2, \quad (4)$$

Kt: proportional constant,
φ2: secondary magnetic flux,
T2: secondary time constant,
s: Laplace operator,
r2: secondary resistance.
m: number of phases,
p: number of pole of pairs.
lm: exciting inductance.
l2: secondary leakage inductance, $$Iq = \sqrt{2/3} \cdot (iu \cdot \cos\theta1 + iv \cdot \cos(\theta1 - 2\pi/3) + iw \cdot \cos(\theta1 + 2\pi/3)), \quad (5)$$

$$Id = \sqrt{2/3} \cdot (iu \cdot \sin\theta1 + iv \cdot \sin(\theta1 - 2\pi/3) + iw \cdot \sin(\theta1 + 2\pi/3)). \quad (6)$$

The difference between the torque τM and τ* obtained from a torque calculator 130 is calculated by a subtracter 111, and a torque component current command Iq* is determined for example, by causing both torques to come into agreement. The torque component current command Iq* is input to an alternating current command generator 145 through the limiter 137. As described above, the limiter value of the limiter 137 is controlled by the torque current reducing signal generator 136.

On the other hand, in a case where the battery voltage judged by the voltage level determinator 176 exceeds the preset value, it is judged that the energy receiving capability of the battery 10 is below the preset value even when a brake signal is put out from the acceleration/braking determinator 115. In this case, since the battery is in an over charged state, regeneration braking cannot be performed. Therefore, in this case, the mode is switched to the free-wheel mode.

In other words, a reducing signal is put out from the regeneration/free-wheel mode selector 120, and the value of the limiter 137 is reduced by the reducing signal to stop the operation of the torque controller 135. As a result, since Iq*=0, the value of the amplitude I1* of the alternating current command signal obtained from the alternating current command generator 145 is controlled only by the magnetizing component current command Id* output from a magnetic flux controller 140 based on Equation (7).

$$(I1^*)^2 = (Id^*)^2 + (Iq^*)^2 \quad (7)$$

Through this operation, the torque component current Iq becomes zero or smaller than an infinitesimal current equivalent to substantially zero. Therefore, only the magnetizing component current Id from the battery 10 flows through the primary winding to consume the energy of the battery 10 as heat. Since the torque τM generated in the motor at this time is also expressed by Equation (8), a driving torque is not generated in the motor.

$$\tau M \propto Id \cdot Iq \quad (8)$$

Consequently, the voltage of the battery 10 is decreased by consuming the energy of the battery 10.

Then, when the voltage level determinator 176 judges that the voltage of the battery is below the preset value, the regeneration/free-wheel mode selector 120 selects the regeneration mode. At this time a reducing stop command is put out, the limiter reducing operation of the limiter 137 being stopped by the torque current reducing generator 136, and torque control is performed by the torque controller 135.

On this occasion, since the difference between the torque command τ* and the generated torque τM becomes negative, the slip angular frequency ωs obtained from a slip frequency calculator 150 becomes negative and consequently a regeneration braking force can be obtained.

The value of the primary angular frequency ω1 expressed by Equation (9) decreases since a negative angular frequency ωs expressed by Equation (10) is present, and so the rotating speed of the alternating current motor 50 is decreased.

$$\omega1 = \omega M + \omega s \quad (9)$$

$$\omega s = (1/T2) \cdot (Iq^*/Id^*) \quad (10)$$

ωM: rotating angular speed,
T2: secondary time constant.

The battery 10 recovers the regeneration energy again in the regeneration mode, the voltage of the battery 10 increases and the over-charged state is detected by the voltage level determinator 176. As the result, a free-wheel mode is selected by the regeneration/free-wheel mode selector 120 again. Then, a control mode-change is executed. With such control, the limiter 137 is reduced (Iq*=0) by the torque current reducing signal generator 136, and the energy of the battery is consumed by allowing only the magnetizing component of current to flow so as to avoid an over-charged state.

That is, the free-wheel mode is selected when the battery reaches an over-charged state, and the energy of the battery is consumed in this mode. Then, the over-charged state is avoided and the mode is changed to the regeneration mode, therefore a braking force by regeneration braking can be obtained. By repeating such operations, the regeneration braking force can be produced with the battery nearly in the over-charged state.

Next, the magnetizing component current command Id* will be described below.

The torque component of current Iq and the magnetizing component of current Id are obtained through the calculations of Equations (5) and (6) using the two-phase/three-phase current converter 125. The secondary magnetic flux φ2 is obtained by Equation (2) described above using the magnetizing component of current Id.

A secondary magnetic flux command φ2* is determined as follows based on the rotating angular speed ωM.

$$0 \leq \omega M \leq \omega M0 \quad \phi2^* = \phi0 \quad (11)$$
$$\omega M0 \leq \omega M \quad \phi2^* = \phi0 \cdot (\omega M0/\omega M)$$
$$\Delta\phi2 = \phi2^* - \phi2.$$

The magnetizing component current command Id* is obtained by executing PI (proportional and integral) compensation of the secondary magnetic flux difference Δφ2. That is, the magnetizing component current command Id* is determined in the magnetic flux controller 140 so that the secondary magnetic flux command φ2* agrees with the secondary magnetic flux φ2. The primary current commands iu*, iv* and iw* are obtained based on the magnetizing component current command Id* and the torque component current command Iq* in the following manner.

$$iu^* = I1 \cdot \cos(\theta1 + \delta)$$
$$iv^* = I1 \cdot \cos(\theta1 + \delta - 2\pi/3) \quad (12)$$
$$iw^* = I1 \cdot \cos(\theta1 + \delta + 2\pi/3)$$
$$\delta = \arctan(Iq^*/Id^*) \quad (13)$$

Each of the primary current commands is input to a current controller 155, which determines the difference between each phase of the primary currents detected by sensors 31, 32, 33. Three phases (not shown) of modulated waves for PWM control are generated in such a manner that the differences are compensated by the current controller 155, and are input to a PWM controller 160. The PWM controller 160 generates three phases of PWM signals by comparing each phase of the modulated waves with a triangular-wave-shaped carrier, the PWM signals being applied to each arm of the gate in the PWM inverter 40 to control the currents flowing in the primary windings of the alternating current motor 50.

Although the above description relates to a case where the acceleration/braking determinator 115 judges a brake mode when the accelerator is released and $d\tau M^*/dt$ becomes negative, entirely the same operation is performed when the brake pedal is pushed and a brake command $\tau B$ (<0) is generated.

Figure 2:
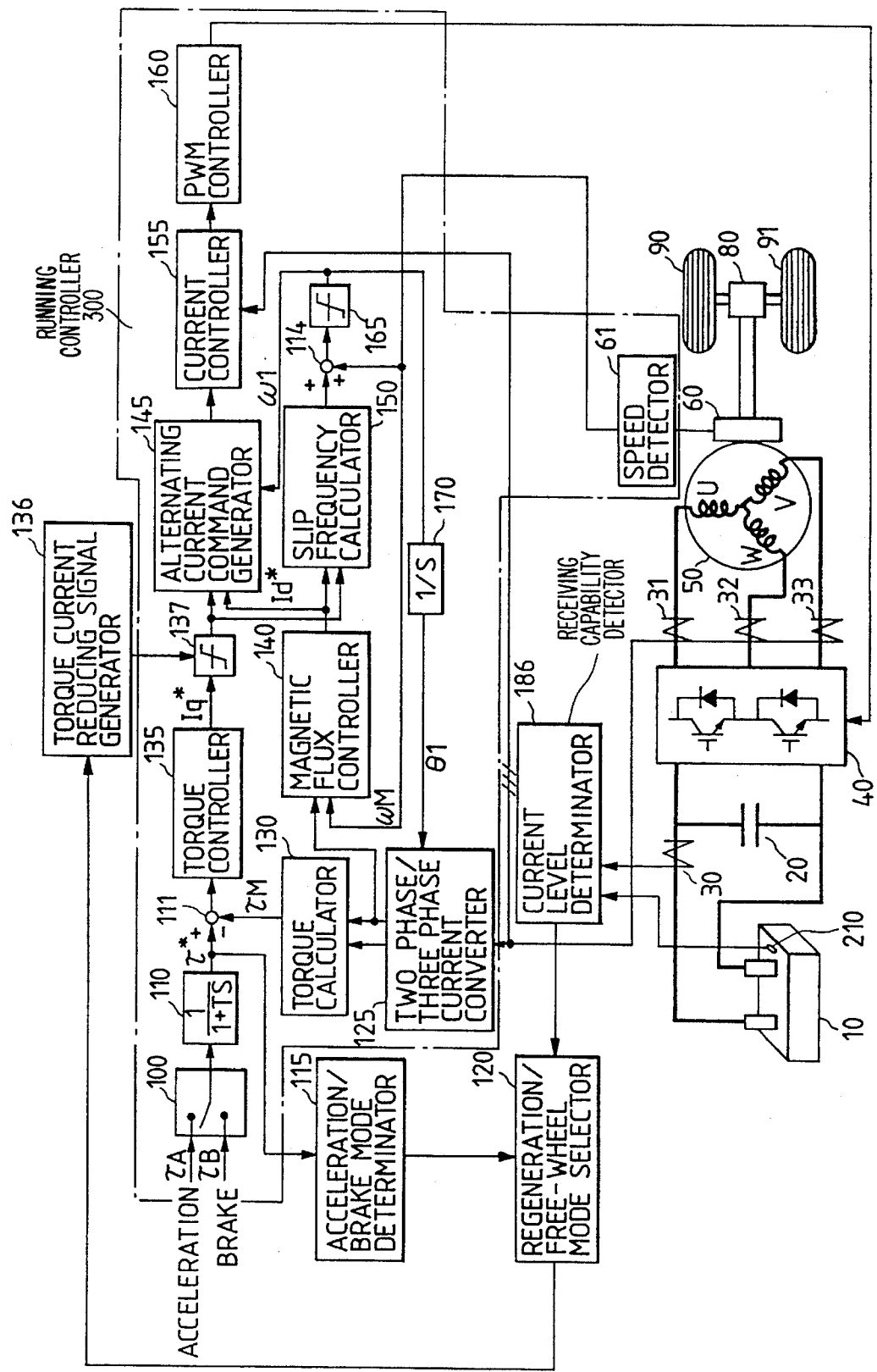
FIG. 2 is a block diagram showing another embodiment of a control system for regeneration braking of an electric vehicle utilizing a free-wheel mode in accordance with the present invention.
Figure 3:
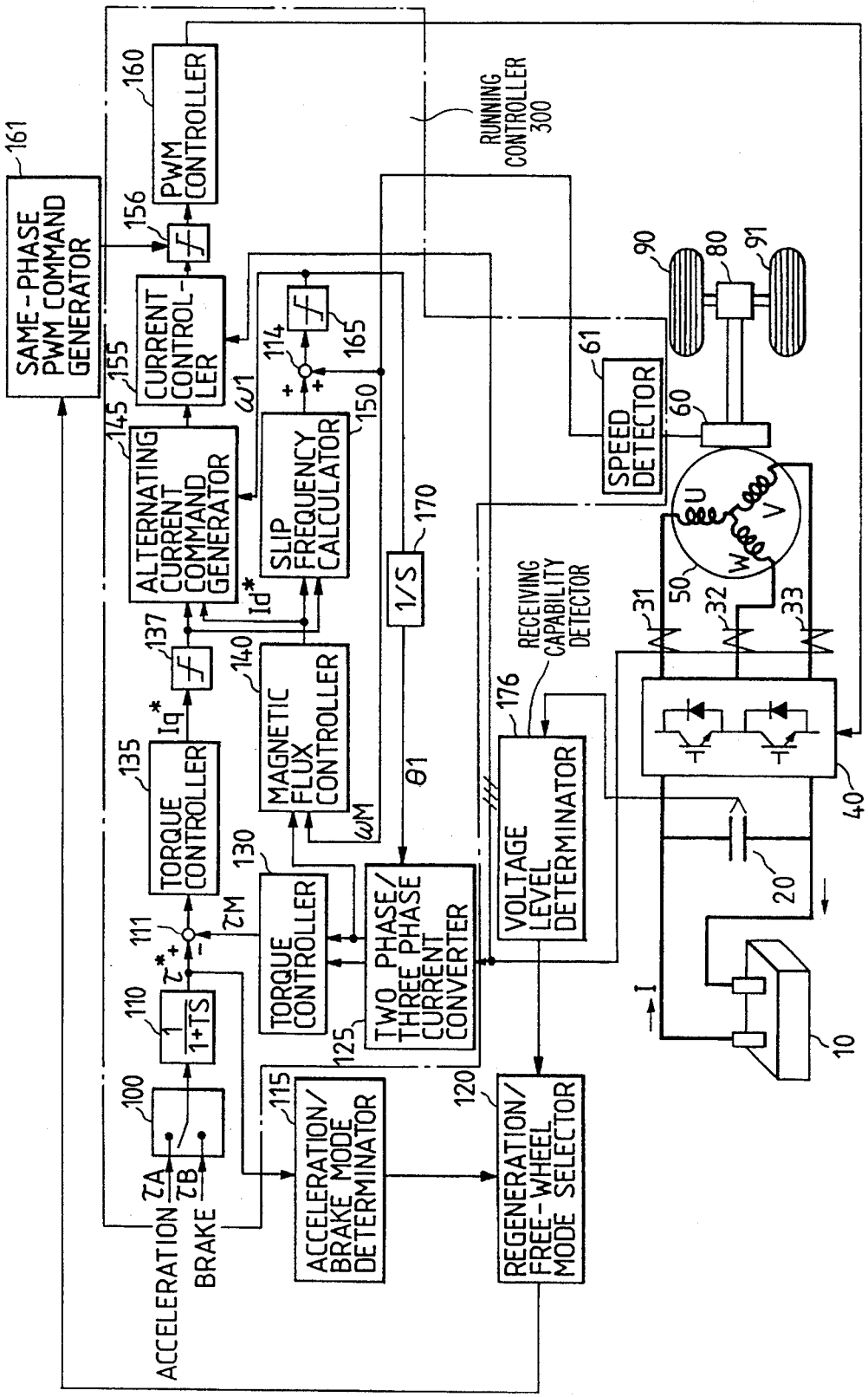
FIG. 3 is a block diagram showing a further embodiment of a control system for regeneration braking of an electric vehicle utilizing a free-wheel mode in accordance with the present invention.
Figure 4:
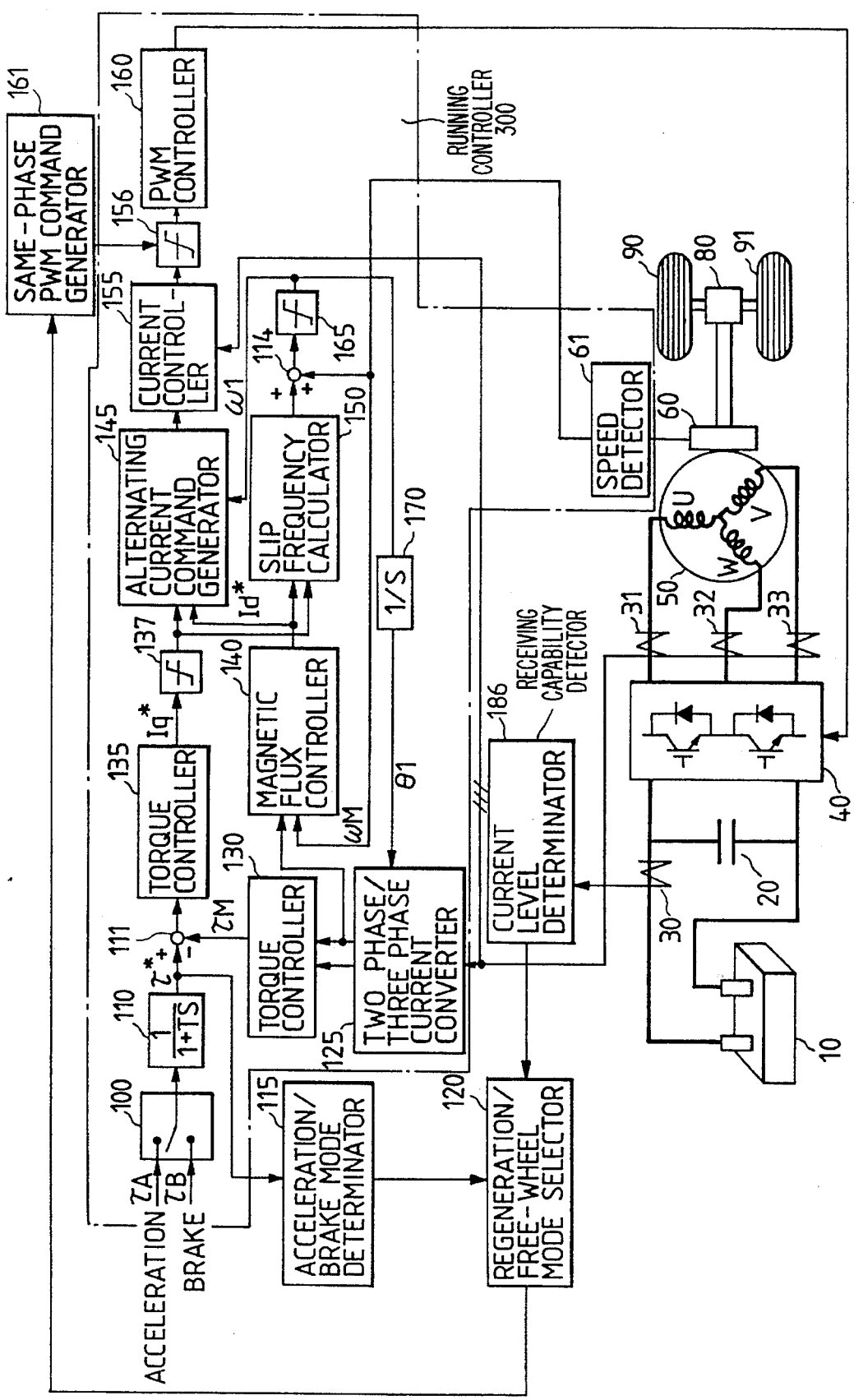
FIG. 4 is a block diagram showing a further embodiment of a control system for regeneration braking of an electric vehicle utilizing a free-wheel mode in accordance with the present invention.

FIG.2, FIG.3 and FIG.4 each show other embodiments of free-wheel modes.

FIG.2 shows an embodiment in which a current level determinator 186 is provided to operate as the receiving capability detector to judge the magnitude of charging current to the battery as the switching condition for the regeneration/free-wheel mode. The current level determinator 186 is provided instead of the voltage level determinator 176 in FIG.1. The current level determinator controls switching between the regeneration mode and the free-wheel mode by utilizing the phenomenon that charging current does not flow when the battery is in an over-charged state. That is, when the acceleration/brake mode determinator 115 judges that the state is a brake mode and the current level determinator 186 judges that the current flow is above a preset value, it is judged that the energy receiving capability of the battery 10 is larger than a preset value. If the energy receiving capability of the battery 10 is larger than the preset value, the regeneration mode is selected. If not, the free-wheel mode is selected. After the mode is selected, regeneration braking control is performed in the same manner as described with reference to FIG. 1 using the running controller 300. Therefore, further explanation thereof will be omitted here.

Incidentally, a plurality of batteries are generally used in an electric vehicle in order to increase the voltage available to the vehicle. And, when the temperature of the batteries becomes higher than an allowable temperature due to regeneration charging and the charging is continued under that condition, the set of batteries is rapidly degraded. Therefore, if the temperature of at least one of the set of batteries is higher than the allowable temperature, it is dangerous to continue to require the batteries to recover regeneration energy even when it is judged from the voltage of the batteries or the charging current that the batteries are not in the over-charged state. In such a case, it is judged that the energy receiving capability of the battery is smaller than the preset value.

The temperature of the set of battery is detected by a temperature sensor 210. As soon as the regeneration charging is stopped, the mode is switched from the regeneration mode to the free-wheel mode to consume the energy of the battery and recover the energy receiving capability of the battery. According to this method, a certain magnitude of regeneration braking force can be obtained and the battery can be protected as well.

In the above embodiment, although the state of the battery is judged by detecting various kinds of information, such as the voltage of the battery, charging current and the temperature, thereof it is possible to judge the state of the battery from a combination of such information. For example, the preset value for judgement may be varied with the temperature of the battery as a parameter. In a case of employing the voltage of the battery as the value for judgement, when the temperature of the battery increases, the preset value for judgement of the voltage of the battery in the voltage level determinator 176 is shifted toward the lower side.

Further, in the operation of the voltage level determinator 176 or the current level determinator 186, the preset value for judging whether to switch from the regeneration mode to the consumption mode and the preset value for judging whether to switch from the consumption mode to the regeneration mode need not to be the same value. It is possible for there to be a certain difference between the preset values for judging whether to switch from the regeneration mode to the consumption mode and vice versa. This means that the switching of the mode to the regeneration mode is carried out not immediately after the over-charged state is eliminated, but is delayed until the energy of the battery is sufficiently consumed, that is, until the time when the energy receiving capability of the battery is sufficiently recovered. This corresponds to a control performing switching at a boundary of "the preset value having a predetermined width".

FIG. 3 is a block diagram showing another embodiment for consuming the energy of a battery without causing acceleration of the motor during regeneration braking. The torque current reducing signal generator 136 and the limiter 137 in FIG. 1 are replaced by a same-phase PWM command generator 161 and a limiter 156. The limiter 156 is provided at the output side of the current controller 155, and the limiter value output to the PWM controller 160 is controlled by the same-phase PWM command generator 161.

When the regeneration mode is selected by the regeneration/free-wheel mode selector 120, the same-phase PWM command is not put out from the same-phase PWM command generator 161. In this case, the modulated wave output from the current controller 155 is directly input to the PWM controller 160. And, regeneration braking control is performed based on, torque controller 135, for supplying the regeneration energy to the battery 10.

In the case of switching the mode to the free-wheel mode, a same-phase PWM command is put out to the limiter 156 from the same-phase PWM command generator 161. In this case, the value of the amplitude of the modulated wave is reduced to zero, and each phase of the PWM signals becomes a signal repeating the switching of the gate of the inverter ON-OFF with the same phase in each of all the phases and with the same frequency as that of the triangular carrier. By applying the same-phase PWM signal to each of the gates of the inverter, the line voltage (output voltage) of the PWM inverter 40 becomes zero or lower than an infinitesimal voltage equivalent to substantially zero. Only the portion of energy exciting the primary winding of the motor is supplied, and consequently a driving torque is not generated in the motor 50. Therefore, the energy of the battery is consumed by the ON-OFF operation.

Therein, the torque $\tau M$ generated in the motor 50 is expressed by Equation (14).

$$\tau M \propto (V)^2/f \qquad (14)$$

V; voltage between lines,
f; primary frequency.

Therefore, it can be understood that when the line voltage is zero, the driving torque of the motor is not generated.

When the over-charged state of the battery 10 has been avoided by this operation, the mode is switched again to the regeneration mode and a regeneration braking force can be obtained.

FIG. 4 shows a further embodiment where a current level determinator 186 is used instead of the voltage level determinator 176 in the embodiment shown in FIG. 3, and the over-charged state is determined from the charging current flowing to the battery 10. Since the process after judgement of the regeneration/free-wheel mode is the same as the process in FIG. 3, a detailed explanation thereof will be omitted here.

Figure 5:
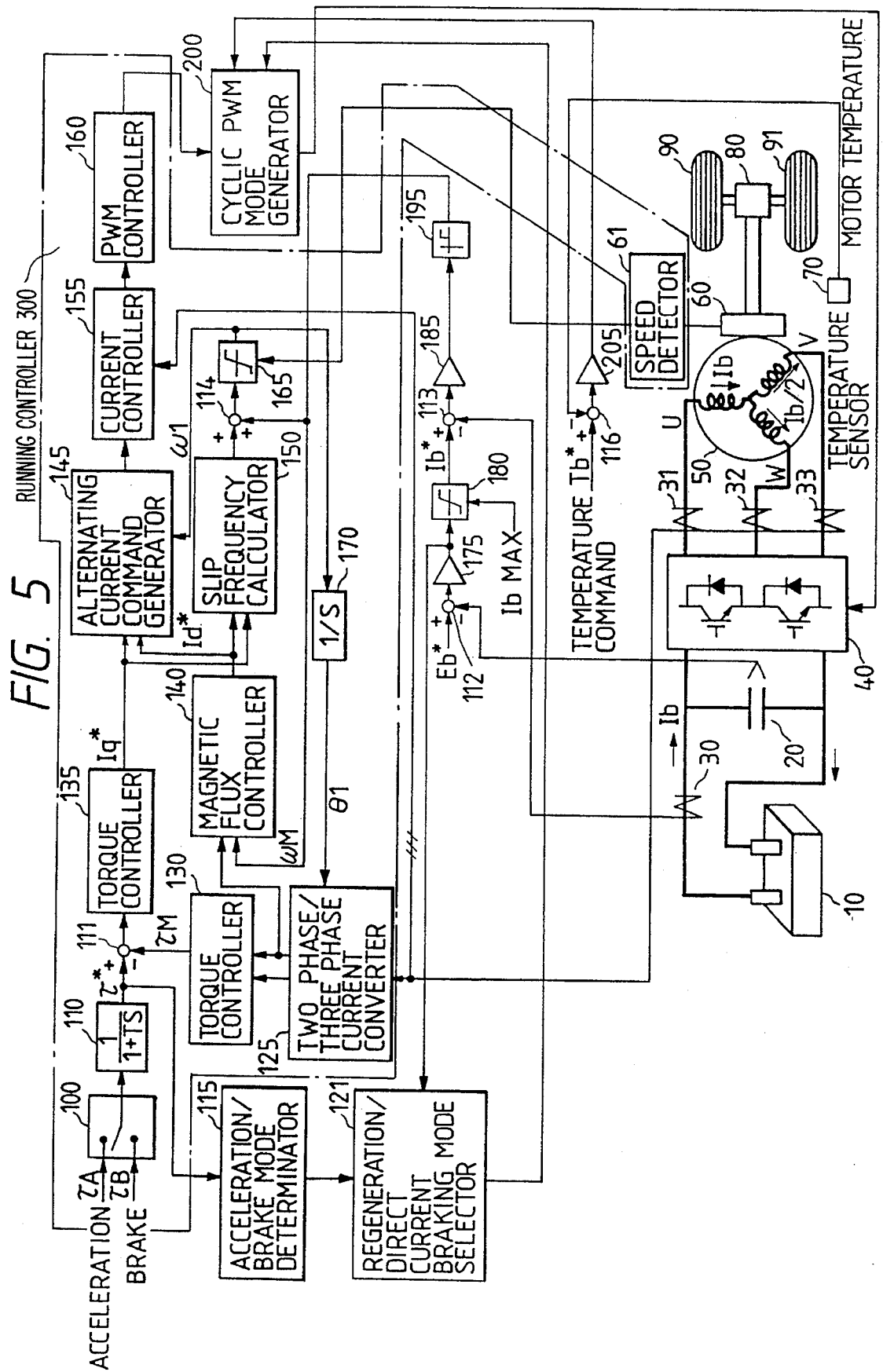
FIG. 5 is a block diagram showing an embodiment of a control system for regeneration braking of an electric vehicle utilizing a direct current braking mode in accordance with the present invention.

FIG. 5 is a block diagram showing another embodiment of a regeneration braking control system according to the present invention which uses a direct current brake mode. Although this embodiment is the same as the embodiments described in FIG. 1 to FIG. 4 with respect to performing switching control between the consuming and the receiving of the energy of the battery, the difference is that this embodiment can additionally obtain a braking force while the energy is being consumed.

Switching of the regeneration/direct current brake mode is performed with the regeneration/direct current braking selector 121 using an output signal from the acceleration/braking mode determinator 115 and an over-charged state judging signal, represented by the output from the PI compensator 175. The voltage difference between a preset standard voltage Eb* (a voltage used for judging the over-charged state of the battery) and the detected terminal voltage of the smoothing capacitance 20 is amplified by an amplifier 175, and then a charging current command Ib* is obtained through a limiter 180. Therein, the value in the limiter 180 is generally set to the maximum value $Ib_{max}$ of the charging current. The difference between the charging current command Ib* and the battery current Ib is obtained and amplified by amplifier 185, and then the amplified difference acts to determine the maximum value of the primary angular frequency ω1 through a limiter 195 having an insensitive band.

On the other hand, the output from the PWM controller 160 is input to a cyclic PWM mode generator 200, and the PWM inverter 40 is controlled based on the PWM signal cyclically put out from the cyclic PWM mode generator 200.

The specific operation of the embodiment will be described below. In a case where a braking signal is output from the acceleration/braking mode determinator 115 and input to the regeneration/direct current braking mode selector, 121 either the regeneration mode or the direct current braking mode is selected based on the over-charged state judging signal obtained from the amplifier 175.

As described above, the over-charged state is judged from the difference between the standard voltage Eb* and the voltage of the smoothing capacitor 20. When the difference is large, the output of the amplifier 175 is saturated and is the value $Ib_{max}$, which is the limit value of the limiter 180. In such a condition, it is judged that the battery 10 is not in the over-charged state, but is capable of receiving energy, and therefore the regeneration mode is selected.

Then, when the voltage of the smoothing capacitance increases near the standard voltage Eb* while the regeneration braking is being performed, the saturation described above is released and the charging current command Ib* determined by the amplifier 175 is obtained. Since the difference between the value Ib* and the battery current amplified by the amplifier 185 is not below the preset value in the beginning, the limiter 195 puts out a value equal to the limit value for the primary angular frequency ω1. Therefore, the primary angular frequency ω1 is decreased within the range of the limiter 165.

Then, when the charging current command Ib* decreases and the value amplified by the amplifier 185 falls below the preset value, it is judged that the over-charged is present and the mode is switched to the direct current braking mode. As a result, the regeneration/direct current mode selector 121 puts out a command corresponding to the direct current mode to the cyclic PWM mode generator 200.

In this condition, the output value of the amplifier 185 is also decreased and the output value from the limiter 195 is held to zero. Therefore, the limiter 165 is reduced to zero and the primary angular frequency ω1 also becomes zero. Then, the phase θ1 of the alternating current command generated from the alternating current command generator 145 is fixed to a phase θ1 (n), which is the phase when the primary angular frequency ω1 becomes zero, and a direct current command having a value corresponding to the phase θ1n is generated from the alternating current command generator 145. The current controller 155 determines the modulation level so that a direct current based on the direct current command flows.

A PWM signal corresponding to the modulation level is put out by comparing the modulation level with the triangular-wave-shaped carrier. On this occasion, if the mode in the PWM signal is, for example, (1,0,0), the positive side arm in the U-phase and the negative side arms in the V- and W-phases perform an ON-OFF operation, and direct current flows through each of the primary windings in the directions shown in FIG. 6 (a). The direct current excites the primary winding to produce a magnetic field. The rotor of the motor crosses the magnetic field to induce an electric motive force and receives a braking force by operating as an electric generator of the rotating armature type.

In this case, a battery current Ib flows through the primary winding in the U-phase and the current Ib/2 flows in each of the primary windings in the V- and W-phases. Thereby, if current continues to flow under such a condition, the temperature of the primary winding in the U-phase becomes higher than the temperature of the windings in the other phases according to the amount of the excess current. Consequently, degradation in the insulation may occur due to local over-heating of the winding. Therefore, the following method is employed to prevent the temperature of the primary winding from exceeding a standard temperature Tb*, which is the critical temperature for degradation of the insulation.

Figure 6:
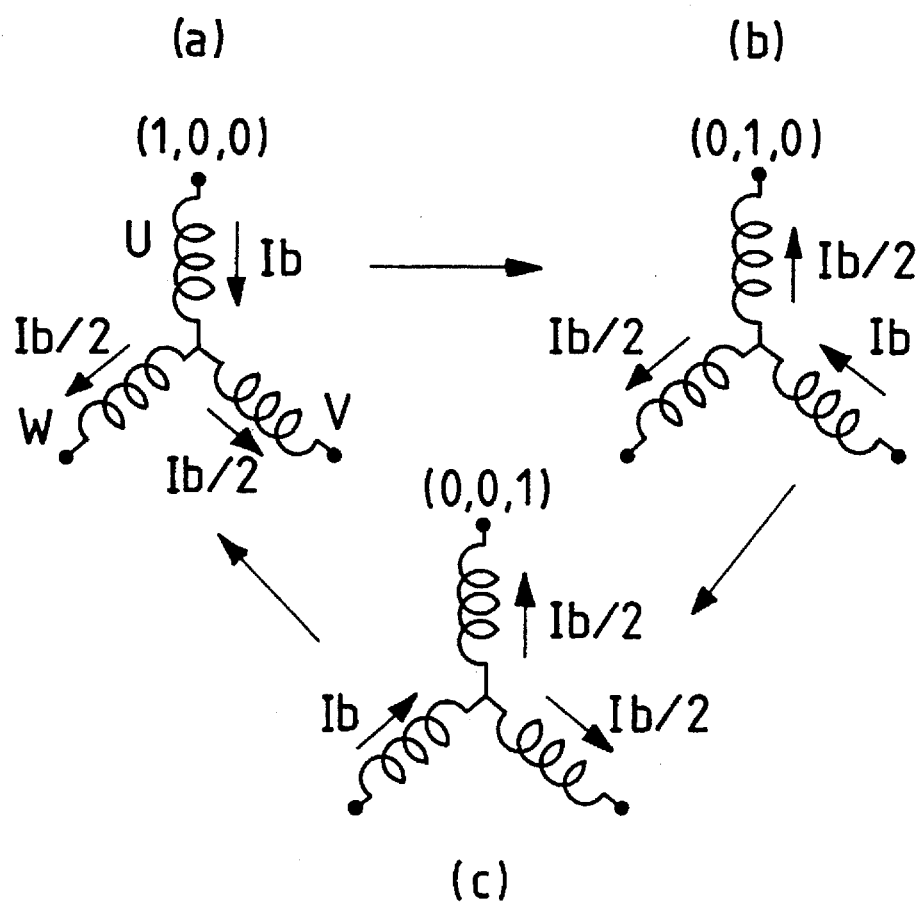
FIG. 6 is a dragram explaining cyclic change of a PWM mode.

The winding temperature of the motor is detected with a temperature sensor 70. The detected winding temperature is fed back to compare it with the standard temperature Tb*, and the difference is amplified with an amplifier 205. The cyclic PWM mode generator 200 changes the PWM mode in such a manner that the amplified difference does not fall below a preset value; for example, as shown in FIG. 6, the PWM mode is cyclically changed from (a) to (b), from (b) to (c), from (c) to (a). By doing so, the local over-heating of the winding is prevented. In addition to this, since the cyclic change of the PWM mode makes the temperature inside the motor uniform, it is effective for the life of the motor.

In this direct current braking mode, a braking force can be obtained while the energy of the battery is being consumed. However, since the temperature inside the motor increases, it is difficult to expect a significant amount of braking force to be obtained in this mode Therefore, the basic control of this mode is that, when the over-charged state is eliminated by consuming the energy of the battery 10 with the direct current braking mode, the mode is switched to the regeneration mode to perform braking control.

In the energy consumption mode described above, consuming the energy of the battery is performed by heat dissipation in the inside of the motor, the inverter or the wiring. The following method can be considered as another energy consumption mode other than the above.

A torque command $\Delta\tau^*$ is generated, and the torque command $\Delta\tau^*$ produces an infinitesimal torque in the motor small enough not to substantially accelerate the vehicle. Based on the torque command, an infinitesimal torque $\Delta\tau$ is generated in the motor using the energy of the battery to obtain an infinitesimal power $\Delta P$ (output energy) expressed by Equation (15).

$$\Delta P \propto \Delta\tau \cdot \omega M \qquad (15)$$

Therein, the magnitude of the power $\Delta P$ is nearly equal to the mechanical energy loss consumed by the torque transmission mechanism in the vehicle. That is, the power is too small to accelerate the vehicle. Thereby, the energy of the battery can be consumed by the amount of the power without impairing the driving performance of the vehicle.

Although, in the various embodiments, the case of using an induction motor is described, it is possible to use an alternating current motor, such as a brushless synchronizing motor having a rotor composed of a permanent magnet.

As described above, according to the present invention, the braking force necessary for an electric vehicle can be always maintained by performing switching between a regeneration mode and an energy consumption mode depending on the state of the battery 10 during braking.

According to the present invention, the energy of a battery is consumed by heat loss inside the motor or the inverter when the battery is in an over-charged state, and the energy of the regeneration braking is received by the battery when the battery has recovered by consuming energy until the battery reaches a state capable of receiving energy. Therewith, the required force of regeneration braking can be always obtained independently of the state of the battery by performing switching between energy consuming and energy receiving modes. This leads to safe driving of an electric vehicle.

Further, since surplus regeneration energy can be received by the battery, there is no need to provide a large wattage resistance or a switching element in parallel to the smoothing capacitance as in the conventional system, which leads to a small sized apparatus and a cost reduction.

What is claimed is:

1. In a control method for regeneration braking of an electric vehicle having a battery, a motor for driving the vehicle, an electric power converter for converting and supplying power of said battery to said motor, a running controller for controlling said electric power converter using pulse width modulation, wherein a braking force is applied to said motor while regeneration energy from said motor is being charged to said battery, and mode switching control means for switching operating modes of said running controller to a consumption mode or to a regeneration mode, the control method comprising the steps of:

detecting an energy receiving capability of said battery using a receiving capability detecting means;

comparing the energy receiving capability of said battery during braking of the electric vehicle with a preset value of energy receiving capability; and switching said running controller to a consumption mode when said energy receiving capability is lower than said preset value of energy receiving capability during braking, or to a regeneration mode when said energy receiving capability is higher than said preset value of energy receiving capability, wherein during said consumption mode of operation, said running controller controls said electric vehicle so that accumulated energy in said battery is consumed with said motor by causing reactive power in said motor without causing acceleration of said vehicle, and wherein during said regeneration mode of operation, said running controller controls said electric vehicle so that regeneration energy is supplied to and accumulated in said battery.

2. A control method for regeneration braking of an electric vehicle according to claim 1, which further comprises a torque current limiter which gives a maximum value of a torque component of current in said motor, wherein the control method further comprises the steps of:

controlling said electric power converter with pulse modulation control by reducing said maximum value of said torque component of current during said consumption mode to conduct direct current through a primary winding of said motor.

3. A control method for regeneration braking of an electric vehicle according to claim 1, which further comprises a torque current limiter which gives a maximum value of a torque component of current in said motor, wherein the control method further comprises the steps of:

controlling said electric power converter with pulse width modulation control using a same phase PWM command generator during said consumption mode to control the torque component of current in said motor using a current vector control method so that said torque component of current in said motor will be zero or smaller than a preset value of the torque component of current.

4. A control method for regeneration braking of an electric vehicle according to claim 1, which further comprises a torque current limiter which gives a maximum value of a torque component of current in said motor, wherein the control method further comprises the steps of:

controlling said electric power converter with pulse width modulation control during said consumption mode to make a line voltage of said electric power converter zero or smaller than a preset value of the torque component of current.

5. A control method for regeneration braking of an electric vehicle according to claim 1, which further comprises a torque current limiter which gives a maximum value of a torque component of current in said motor, wherein the control method further comprises the steps of:

controlling said electric power converter with pulse width modulation control by reducing said maximum value of said torque component of current during said consumption mode to make the output energy of said motor comparable to a mechanical energy loss of said electric vehicle.

6. A control method for regeneration braking of an electric vehicle according to claim 1, wherein said switching step includes comparing a terminal voltage of a smoothing capacitance connected in parallel to said battery with said preset value.

7. A control method for regeneration braking of an electric vehicle according to claim 1, wherein said method further comprises the steps of:

comparing accumulating current flowing into said battery during said regeneration mode with said preset value.

8. A control method for regeneration braking of an electric vehicle according to claim 1, wherein said switching step includes comparing the temperature of said battery with a preset temperature value.

9. A control method for regeneration braking of an electric vehicle according to claim 1, which further comprises detecting means for detecting a terminal voltage of a smoothing capacitance connected in parallel to said battery, accumulating current flowing into said battery during said regeneration mode and temperature of said battery, wherein said switching step comprises:

comparing said terminal voltage, said accumulating current and said temperature of said battery with preset values of a voltage, preset values of a current and preset values of a temperature, respectively; and switching said mode of said running controller when at least one of the compared values reaches said preset values of the voltage, preset values of the current or preset values of the temperature.

10. A control method for regeneration braking of an electric vehicle according to claim 2, which further comprises the steps of:

supplying a direct current through said primary winding of said motor to cause a braking force in said motor;

detecting said direct current flowing through said primary winding and a temperature of said primary winding; and controlling said direct current to decrease when the temperature of said primary winding exceeds a preset value of temperature.

11. A control method for regeneration braking of an electric vehicle according to any one of claims 1 through claim 10, wherein:

said preset value has a predetermined range of values.

12. A control method according to claim 1, wherein said battery is the sole power source for driving the vehicle.

13. A control system for regeneration braking of an electric vehicle having a battery which is a sole power source for driving the vehicle, a motor for driving the vehicle, an electric power converter for converting and supplying power of said battery to said motor, and means for applying a braking force to said motor while regeneration energy from said motor is being accumulated in said battery, which system comprises:

receiving capability detecting means for detecting energy receiving capability of said battery; and mode switching control mans for switching to a consumption mode where accumulated energy in the battery is consumed with said motor by causing reactive power in said motor without causing acceleration of the electric vehicle or to a regeneration mode where said regeneration energy is accumulated in said battery depending on information concerning the energy receiving capability of said battery which is obtained from said receiving capability detecting means.

14. A control system for regeneration braking of an electric vehicle according to claim 13, wherein said system further comprises:

detecting means for detecting a terminal voltage of a smoothing capacitance connected in parallel to said battery, accumulating current flowing into said battery during said regeneration mode and temperature of said battery, wherein said switching control means further comprise:

comparing means for comparing said terminal voltage, said accumulating current and said temperature of said battery with preset values of a voltage, preset values of a current and preset values of a temperature, respectively, and switching means for switching between said regeneration mode and said consumption mode when at least one of the compared values reaches said preset values.

15. A control system for regeneration braking of an electric vehicle according to claim 13, which further comprises:

a cycle PWM mode generator for generating a different type PWM mode cyclically selected from a plural PWM modes; and current control means for controlling direct current flowing through a primary winding of said motor by using said cycle PWM mode so as to decrease said direct current when the temperature of the primary winding of said motor exceeds the preset value of temperature.

* * * * *